(12) United States Patent
Kawasoe et al.

(10) Patent No.: US 8,628,873 B2
(45) Date of Patent: Jan. 14, 2014

(54) SEPARATOR FOR LITHIUM ION SECONDARY BATTERY AND METHOD FOR MANUFACTURING THE SAME

(75) Inventors: Shinya Kawasoe, Tokyo (JP); Hiroshi Hatayama, Tokyo (JP); Takashi Ikemoto, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 407 days.

(21) Appl. No.: 12/514,780

(22) PCT Filed: Nov. 12, 2007

(86) PCT No.: PCT/JP2007/071949
§ 371 (c)(1),
(2), (4) Date: Jan. 29, 2010

(87) PCT Pub. No.: WO2008/059806
PCT Pub. Date: May 22, 2008

(65) Prior Publication Data
US 2010/0136410 A1 Jun. 3, 2010

(30) Foreign Application Priority Data
Nov. 14, 2006 (JP) .................................. 2006-307725

(51) Int. Cl.
*H01M 2/14* (2006.01)
(52) U.S. Cl.
USPC ............ 429/129; 429/209; 429/247; 429/252
(58) Field of Classification Search
USPC .................................. 429/129, 209, 247, 252
See application file for complete search history.

(56) References Cited

U.S. PATENT DOCUMENTS

| | | | |
|---|---|---|---|
| 4,950,566 A | 8/1990 | Huggins et al. | |
| 6,566,012 B1 | 5/2003 | Takita et al. | |
| 7,192,673 B1 | 3/2007 | Ikeda et al. | |
| 2005/0019665 A1 | 1/2005 | Adachi et al. | |
| 2005/0100782 A1* | 5/2005 | Iijima et al. | 429/137 |
| 2006/0040175 A1* | 2/2006 | Zuckerbrod et al. | 429/142 |
| 2006/0099497 A1* | 5/2006 | Uetani et al. | 429/144 |
| 2010/0136410 A1 | 6/2010 | Kawasoe et al. | |

FOREIGN PATENT DOCUMENTS

| | | |
|---|---|---|
| JP | 6-163023 | 6/1994 |
| JP | 6-223802 | 8/1994 |
| JP | 8-138644 A | 5/1996 |
| JP | H 9-216964 | 8/1997 |
| JP | 10-195215 | 7/1998 |
| JP | 2000-007819 A | 1/2000 |
| JP | 2002-83594 A | 3/2002 |
| JP | 2002-164031 A | 6/2002 |
| JP | 2003-105121 A | 4/2003 |
| JP | 2005-228514 | 8/2005 |
| JP | 2006-004873 | 1/2006 |
| JP | 2006-134757 A | 5/2006 |
| KR | 10-2005-39745 | 4/2005 |
| TW | 1230173 | 4/2005 |
| WO | WO 2008/059806 A1 | 5/2008 |

OTHER PUBLICATIONS

Office Action dated Apr. 29, 2011 issued in corresponding Taiwanese Application No. 096143077.
Notice of Information Submission dated May 23, 2011 from Japan Patent Office.
Korean Office Action dated Sep. 19, 2011.

\* cited by examiner

*Primary Examiner* — Jane Rhee
(74) *Attorney, Agent, or Firm* — Finnegan, Henderson, Farabow, Garrett & Dunner, L.L.P.

(57) ABSTRACT

A separator for a lithium ion secondary battery with an alloy based negative electrode, wherein a dynamic friction coefficient of at least one surface is 0.1 or more and 0.4 or less, and a method for manufacturing the same.

10 Claims, No Drawings

SEPARATOR FOR LITHIUM ION SECONDARY BATTERY AND METHOD FOR MANUFACTURING THE SAME

CROSS REFERENCE TO RELATED APPLICATIONS

This application is a national phase application based on PCT/JP2007/071949, filed Nov. 12, 2007, which claims the priority of Japanese Patent Application No. 2006-307725, filed Nov. 14, 2006, the content of both of which is incorporated herein by reference.

TECHNICAL FIELD

The present invention relates to a separator for a lithium ion secondary battery using an alloy based negative electrode, and a method for manufacturing the separator.

BACKGROUND ART

A lithium ion secondary battery has advantages such as a high capacity, a light weight and a long life, and hence it has rapidly prevailed as a power source of a portable electronic apparatus such as a cellular phone, a notebook-size personal computer, a video movie camera or a digital camera. In recent years, a demand for the high capacity of the lithium ion secondary battery is increasing more and more. Heretofore, as a material for a negative electrode of the lithium ion battery, there has been used a carbon material such as sparingly graphitizable carbon or graphite, but the effective capacity of such a carbon material has already been saturated from the viewpoint of an industrial technology, and it is difficult to further heighten the capacity. To solve the problem, it has recently been investigated to use a new negative electrode material of a so-called alloy based negative electrode, for example, a metal such as silicon (Si) or tin (Sn), or a semimetal disclosed in Patent Document 1.

However, it is known that the volume expansion coefficients of Si and Sn during the occlusion of lithium are around 300% and 250%, respectively, whereas that of carbon is 12%. Therefore, each volume of Si and Sn changes 20 times or more as much as that of carbon. Moreover, it has been pointed out that a solid electrolyte interface (SEI) formed on the surface of the negative electrode is broken and repaired each time the electrode noticeably expands and contracts, and in consequence, lithium in the battery is noticeably consumed, which deteriorates cycle characteristics of the battery. Owing to this fact, Si and Sn are not broadly put to practical use, though each of Si and Sn has a very attractive potential ability that its theoretical capacity is about ten times as much as that of carbon. For example, in Patent Document 2, it has been investigated that the shape of the Si-based negative electrode is contrived to alleviate an expansion amount, but only by this contrivance, the deterioration of the cycle characteristics cannot sufficiently be suppressed. On the other hand, when such an alloy based negative electrode material is used, a separator adjacent to this material is directly under its influence. Therefore, the separator is required to have compressive resistance as a function of absorbing or withstanding the expansion and contraction of the material.

In addition to the requirement of the compressive resistance, it is also expected that the separator can keep its basic function which is insulation between positive and negative electrodes, and can prevent the deterioration of a battery performance, for example, the deterioration of the cycle characteristics due to clogging caused by compression.

In Patent Document 3, the strength of the separator is regulated to try the improvement of the characteristics of the battery at a high temperature or the safety of the battery, but the alloy based negative electrode noticeably expands or contracts even at normal temperature, and hence the battery characteristics at normal temperature are not sufficiently improved.

Patent Document 1: U.S. Pat. No. 4,950,566
Patent Document 2: Japanese Patent Application Laid-Open No. 2002-83594
Patent Document 3: Japanese Patent Application Laid-Open No. 2006-134757

DISCLOSURE OF THE INVENTION

Problem to be Solved by the Invention

An object of the present invention is to provide a separator for a lithium ion secondary battery using an alloy based negative electrode, a surface portion of which does not collapse even when it is used together with an alloy based negative electrode which noticeably expands and contracts, whereby the deterioration of the permeability of the separator can be suppressed.

Means for Solving the Problem

The present inventors have intensively and repeatedly investigated the compressive resistance of a separator in a high-capacity lithium ion secondary battery using an alloy based negative electrode, and have eventually found that the whole separator dose not collapsed to lose its function but an only surface portion of the separator collapsed to lose permeability. It has also been found that the collapse of the surface portion can be reduced by adjusting the dynamic friction coefficient of the separator into a specific numerical value range, whereby it is possible to obtain the suitable separator for the high-capacity lithium ion secondary battery using the alloy based negative electrode, and consequently the present invention has been completed.

That is, the present invention is as follows:

(1) A separator for a lithium ion secondary battery with an alloy based negative electrode, wherein a dynamic friction coefficient of at least one surface is 0.1 or more and 0.4 or less.

(2) A separator for a lithium ion secondary battery with an alloy based negative electrode, which comprises at least two layers, wherein a dynamic friction coefficient of a surface layer is 0.1 or more and 0.4 or less.

(3) The separator according to the above (1) or (2), having a porosity of 10% or more and 80% or less.

(4) The separator according to the above (1) to (3), having a thickness change allowance of 5 μm or more and 20 μm or less.

(5) The separator according to any one of the above (1) to (4), having a pore diameter of from 0.01 to 0.1 μm and a thickness of from 1 to 50 μm.

(6) The separator according to any one of the above (1) to (5), having a puncture strength of 0.15 N/μM or more.

(7) The separator according to any one of the above (1) to (6), wherein a main component is a polyolefin.

(8) The separator according to the above (7), having a viscosity average molecular weight of 300,000 or more.

(9) The separator according to the above (7) or (8), having a molecular weight distribution Mw/Mn of 3 or more and less than 10.

(10) A method for manufacturing the separator according to any one of the above (1) to (9), comprising (a) a step of melting and kneading a resin and a plasticizer; (b) a step of extruding the melted material into the form of a sheet, followed by cooling to solidify the sheet; (c) a step of drawing the sheet in at least one direction; (d) a step of extracting the plasticizer; and (e) a step of heat setting the sheet, wherein a heat setting temperature in the step (e) is higher than a temperature which is 10° C. lower than the melting point of the main constituent resin of the separator, and is lower than the melting point of the main constituent resin.

Generally, in a wound-type battery, an electrode active substance is not fixed with a separator. Therefore, when the electrode active substance expands or contracts during the charging/discharging of the battery, the separator is compressed in a thickness direction and friction between the active substance and the surface of the separator occur. When the separator closely contacts with the active substance, the friction therebetween causes a deformation of the separator such as a scrape, twist or collapse.

According to the separator of the present invention, the separator is appropriately disposed so that it does not closely contact with the active substance. As a result, said phenomenon dose not happen, and the collapse of the surface portion of the separator does not occur or is reduced, whereby the deterioration of the permeability of the separator can be suppressed, and thus a battery performance can be maintained even in the high-capacity battery using the alloy based negative electrode material which noticeably expands or contracts.

Effect of the Invention

The separator of the present invention has a small dynamic friction coefficient, and the separator is appropriately disposed so that it does not closely contact with the active substance. Even in a case where the separator is used together with the alloy based negative electrode material which noticeably expands or contracts, the collapse of the surface portion of the separator does not occur or is reduced, whereby the deterioration of the permeability of the separator can be suppressed, and thus a battery performance such as a cycle performance can be maintained even in the high-capacity battery.

BEST MODE FOR CARRYING OUT THE INVENTION

The present invention will hereinafter be described in detail.

A separator of the present invention has an advantage, when used in a lithium ion secondary battery using a so-called alloy based negative electrode. Specifically, the separator can preferably be used in a case where the alloy based negative electrode having a volume expansion coefficient exceeding 120% is used. Such an alloy based negative electrode is coated on one surface or both surfaces of a negative electrode current collector. The negative electrode current collector has a tab attached to a non-coated portion, or the non-coated portion is directly used as a tab. As the negative electrode current collector, a metal foil such as a copper foil is used.

The alloy based negative electrode is a negative electrode containing a negative electrode material as a negative electrode active substance. The negative electrode material contains, as a constituent element, at least one of metallic or semimetallic alloyable elements which can occlude and release lithium as an electrode reactant substance. When such a negative electrode material is used, a high energy density can be achieved. The negative electrode material may be metallic element or semimetallic element alone, or an alloy or a compound, or a material containing phases of one or more thereof. It is to be noted that in the present invention, examples of the alloy include alloys of two or more metallic elements, and alloys of one or more metallic elements and one or more semimetallic elements. Moreover, the alloy may contain a nonmetallic element. The configuration of the alloy may be a solid solution, an eutectic crystal (an eutectic mixture), an intermetallic compound, or a coexistence of two or more thereof. The metallic element or the semimetallic element constituting this negative electrode material is a metallic element or a semimetallic element which can form an alloy with lithium. Typical examples of the above-mentioned element include boron, magnesium, aluminum, silicon, sulfur, titanium, vanadium, chromium, manganese, iron, cobalt, nickel, copper, zinc, gallium, germanium, yttrium, zirconium, niobium, molybdenum, palladium, silver, cadmium, indium, tin, antimony, hafnium, tungsten, platinum, gold, lead, bismuth and gadolinium. Moreover, in the present invention, a composite of the alloy with carbon, silicon oxide, an amorphous substance or the like may be used as the negative electrode material. Furthermore, the negative electrode active substance may be metallic lithium.

In the separator of the present invention, a dynamic friction coefficient of at least one surface thereof is 0.1 or more and 0.4 or less. The dynamic friction coefficient can be measured by a method described later. A direction in which the dynamic friction coefficient of the film is in the above range may be MD or TD direction of a film. However, the friction in the battery especially easily occurs in the MD direction, and hence the dynamic friction coefficient in the MD direction is preferably 0.1 or more and 0.4 or less. Furthermore, the dynamic friction coefficient in the TD direction is also preferably 0.1 or more and 0.4 or less, and the dynamic friction coefficient in the MD direction is especially preferably 0.15 or more and 0.3 or less. When the dynamic friction coefficient exceeds 0.4, the friction is generated between the separator and the active substance when the separator is wound and closely contacts with the active substance, and a deformation such as a scrape, twist or collapse is caused. In consequence, battery performance cannot be maintained anymore. On the other hand, when the dynamic friction coefficient is less than 0.1, the friction generated between the separator and a center core used in winding the battery may be too low to achieve an economical production speed.

Furthermore, when the dynamic friction coefficient of at least one surface of the separator is less than 0.1, the cycle performance of the battery (especially, a cylindrical battery) deteriorates. The reason for this is not known, but in the battery (especially the cylindrical battery), a portion from which a core used in a winding step has been removed remains as an empty space near the center of a wound battery, and the center portion is wound more loosely than the portion near the outer periphery. Therefore, when the negative electrode expands and contracts during charging and discharging, the electrode and the separator are easily displaced at said portion. It is considered that when the dynamic friction coefficient of the separator is less than 0.1, the displacement of the electrode and the separator relatively increases in the MD direction near the center of the wound battery, and the peeling or the like of the surface of the electrode easily occurs, and as a consequence, the area of the electrode is decreased, which leads to the deterioration of the cycle performance. The MD refers to the longitudinal direction of the separator in continuous film production process and of the wound battery, and it is the abbreviation of a Machine Direction. On the other hand, the TD refers to a direction perpendicular to the MD and the width direction of the separator, and it is the abbreviation of a Traverse Direction.

In a case where the separator of the present invention is used in the lithium ion secondary battery using the alloy based negative electrode, it is preferable that the battery is prepared so that the surface of the separator having a dynamic friction coefficient of 0.1 or more and 0.4 or less faces the surface of the negative electrode.

The separator of the present invention has a thickness of preferably 1 or more, more preferably 5 μm or more, especially preferably 10 μm or more from the viewpoint of film strength. Moreover, from the viewpoint of increasing a capacity of the battery, the thickness is preferably 50 μm or less, more preferably 30 μm or less, especially preferably 20 μm or less.

The separator of the present invention is characterized in that the dynamic friction coefficient of the surface of the separator facing the alloy based negative electrode is regulated as described above. Therefore, so long as the dynamic friction coefficient of the surface of the separator facing the negative electrode is 0.1 or more and 0.4 or less, there is not any limitation on the constitution of the separator. For example, the separator may be a laminate including two or more layers. In this case, the outermost surface layer of the surface of the separator facing the negative electrode preferably has a layer thickness of 1 μm or more.

The separator of the present invention can suppress the deterioration of the permeability due to the expansion during the charging of the negative electrode, but a porosity of the separator is preferably 10% or more, further preferably 30% or more, more preferably 40% or more from the viewpoint of securing the battery performance. Moreover, from the viewpoint of the film strength, the porosity is preferably 80% or less, further preferably 70% or less, more preferably 60% or less.

An air permeability of the separator according to the present invention is preferably as low as possible from the viewpoint of the securement of the battery performance as described above, and the air permeability is preferably 1 sec/100 cc or more, further preferably 50 sec/100 cc or more from the viewpoint of balance with the thickness or the porosity. Moreover, from the viewpoint of the permeability, the air permeability is preferably 1000 sec/100 cc or less, further preferably 500 sec/100 cc or less, especially preferably 300 sec or less.

The separator of the present invention has a thickness change allowance of preferably 5 μm or more and 20 μm or less, further preferably 7 μm or more and 20 μm or less. The thickness change allowance is represented by a formula:

(the thickness (μ) of the separator)×(porosity (%))
÷100, and it is the index of a change amount in the thickness direction of the separator. When the thickness change allowance is 5 μm or more, the expanding force of the negative electrode can appropriately be absorbed in the thickness direction. In a case where the thickness is 20 μm or less, insulation properties inherent in the separator can preferably be secured, even when the separator collapsed in the thickness direction.

The separator of the present invention has a puncture strength of preferably 0.15 N/μm or more, further preferably 0.20 N/μm or more, especially preferably 0.25 N/μm or more. When the puncture strength is low, the separator might collapse in the thickness direction due to the expansion of the alloy based negative electrode during charging. In consequence, the insulation properties might not be maintained any more. Moreover, a sharp portion of an electrode material or the like pierces into the separator, whereby pinholes or cracks are easily generated. Therefore, the puncture strength is preferably high.

The separator of the present invention has a tensile strength of preferably 50 MPa or more, further preferably 100 MPa or more in both the MD and TD directions. Moreover, the tensile strength in the MD direction is preferably not noticeably different from the tensile strength in the TD direction so as to prevent the separator from being torn by a protrusion of the electrode material or the like. The tensile strength ratio (MD/TD) between the MD direction and the TD direction is preferably 0.2 to 7.0, further preferably 0.5 to 5.0 in the lithium ion secondary battery using the alloy based negative electrode which noticeably expands during charging.

Considering the use of the separator in the high-capacity lithium ion secondary battery using the alloy based negative electrode, the separator of the present invention is preferably a microporous film rather than non-woven cloth or the like from the viewpoints of physical strength and safety.

In the present invention, the microporous film separator has an average pore diameter of preferably 0.01 μm or more and 0.1 μm or less, further preferably 0.05 μm or more and 0.1 μm or less. When the average pore diameter is less than 0.01 μm, the permeability of ions might be insufficient. When the average pore diameter is larger than 0.1 μm, the insulation properties might deteriorate. The average pore diameter is measured by a method described later.

The separator of the present invention preferably comprises, as a main component, a polyolefin such as polyethylene having a melting point of around 135° C. in view of the securement of the safety of the lithium ion secondary battery. Around 135° C. mentioned above means specifically 130° C. to 138° C.

The microporous film separator functions as a fuse to prevent excessive heat generation by thermal melting to close the micropores and break a current in a case where the battery causes abnormal heat generation. When the function as a fuse is focused on, it is definite that the lower such a temperature as to close the micropores is, that is, the lower the melting point of the main component of the microporous film is, the higher the safety of the battery is. On the other hand, when the melting point of the main component of the microporous film is excessively low, another problem takes place. That is, the thermal resistance of the film deteriorates, with the result that the film of the separator breaks owing to slightly abnormal heat generation. In consequence, short circuit occurs between both electrodes. Therefore, in consideration of the fuse function and the prevention of the short circuit, the melting point of the main component is preferably 130° C. to 138° C.

The main component, used herein, refers to a component (the type of a resin) which occupies 50 wt % or more of constituents (excluding void portions) of the resultant separator. For example, in Example 2 described later, the separator is made of two types of polyethylene and one type of polypropylene, but polyethylene occupies 93 wt % of the separator constituents, and hence the main component is polyethylene.

The polyolefin may be used singly or in a combination of plural kinds thereof. There is not any special limitation on the polyolefin for use in the present invention, examples of the polyolefin include polyethylene, polypropylene and poly-4-methyl-1-pentene, and one or more types of them can be used, but it is preferable to contain one or more of polyethylene with excellent drawing properties during film preparation.

As polyethylene, homopolymer polyethylene having a density of 0.940 g/cm$^3$ or more, or copolymer polyethylene containing 2 mol % or less of α-olefin comonomer is preferred, and homopolymer polyethylene is further preferred. There is not any special limitation on the type of α-olefin comonomer. Polyethylene with a viscosity average molecular weight (Mv) of 50,000 to 10,000,000, especially 100,000 to 3,000,000 is preferred.

There is not any special limitation on a polymerization catalyst of polyethylene, and Ziegler type catalyst, Phillips type catalyst, Kaminski type catalyst or the like may be used. Examples of a polymerization method of polyethylene include one-stage polymerization, two-stage polymerization and multi-stage polymerization, and polyethylene obtained by any one of the methods may be used, but polyethylene obtained by the one-stage polymerization is preferred. Besides the polyplefin as the main component, various kinds of polyolefins may be blended without impairing film preparation properties and without departing from the scope of the present invention. For example, low-melting-point polyethylene including a large content of α-olefin comonomer can be blended for a purpose of the improvement of pore closing characteristics, polypropylene or poly-4-methyl-1-pentene can be blended for a purpose of the improvement of thermal resistance or the like.

Examples of polypropylene usable in the present invention include homopolypropylene, ethylene propylene random copolymer and ethylene propylene block copolymer. Above all, homopolypropylene is preferred. When copolymer is used, the content of ethylene is preferably 1.0 wt % or less in order not to decrease the degree of crystallinity of polypropylene and not to deteriorate the permeability of the microporous film. The Mv of polypropylene is preferably 100,000 or more from the viewpoint of the mechanical strength of the resultant microporous film, and is preferably less than 1,000,000 from the viewpoint of preparation properties. The Mv is more preferably 200,000 to 800,000, further preferably 400,000 to 800,000.

When the main component of the separator of the present invention is the polyolefin, the viscosity average molecular weight of the separator is preferably 300,000 or more. The reason is not known exactly, but when the viscosity average molecular weight of the separator as the final product is 300,000 or more, satisfactory cycle performance are achieved, and this molecular weight is also preferable from the viewpoint of the film strength. There is not any special limitation on the upper limit of the viscosity average molecular weight of the separator, but from the viewpoint of the film preparation properties, the molecular weight is preferably 3,000,000 or less, further preferably 1,000,000 or less.

The viscosity average molecular weight of the separator, used herein, refers to the viscosity average molecular weight of a polymer material constituting the polyolefin microporous film as the separator finally obtained via steps of drawing, extraction, heat setting and the like.

In the separator of the present invention, when the main component is the polyolefin, the molecular weight distribution Mw/Mn of the separator is preferably 3 or more and less than 10 from the viewpoint of pore opening properties. Generally in film processing, when the molecular weight distribution of a film constituent material is broad, excellent drawing properties are achieved. When the molecular weight distribution is narrow, excellent pore opening properties are achieved. In the microporous film separator which is used together with the noticeably expanding/contracting alloy based negative electrode and in which the surface portion might collapse, the excellent pore opening properties need to be achieved, and hence the molecular weight distribution is preferably not excessively broadened.

The Mw/Mn of the separator, used herein, refers to the Mw/Mn of the polymer material constituting the polyolefin microporous film as the separator finally obtained through the steps of drawing, extraction, heat setting and the like.

An additives of inorganic material, an antioxidant, a lubricant, or another improving agent can be added to the separator of the present invention in such a range that any performance is not impaired. The amount of such an additive is preferably 40 wt % or less of a resin component, further preferably 20 wt % or less.

The separator of the present invention can preferably be manufactured by a method for manufacturing the separator, including (a) a step of melting and kneading a resin and a plasticizer; (b) a step of extruding a melted material into a sheet-like material and cooling and solidifying the sheet-like material; (c) a step of drawing the sheet-like material in at least one direction; (d) a step of extracting the plasticizer; and (e) a step of heat setting the material, wherein a heat setting temperature in the step (e) is higher than a temperature which is 10° C. lower than the melting point of the main constituent resin of the separator, and is lower than the melting point of the main constituent resin.

Hereinafter, the method for manufacturing the separator of the present invention will be described, but as long as the resultant separator has characteristics satisfying the present invention, there is not any special limitation on a polymer type, a solvent type, an extrusion method, a drawing method, an extraction method, a pore opening method, a heat setting/heat treatment method or the like.

In the manufacturing method of the present invention, the polyolefin described above is preferably used. As required, the polyolefin can be mixed and used with a known additive, for example, a phenol, phosphor or sulfur based antioxidant, a metal soap such as calcium stearate or zinc stearate, an ultraviolet absorber, a light stabilizer, an antistatic agent, an antidouding agent, a coloring pigment or the like.

The microporous film separator of the present invention can be obtained by (a) the step (the melting and kneading step) of melting and kneading the resin and the plasticizer (the antioxidant and an inorganic powder material as required); (b) the step (the casting step) of extruding the melted material into the sheet-like material and cooling and solidifying the sheet-like material; (c) the step (the drawing step) of drawing the sheet-like material in at least one direction; (d) the step (the extracting step) of extracting the plasticizer, and optionally the inorganic powder material; and (e) the step (the heat setting step) of heat setting the material.

There is not any special limitation on the order of these steps and the number of the times of the steps, but the following three examples are preferred.

1. the step (a)→the step (b)→the step (c)→the step (d)→the step (e)
2. the step (a)→the step (b)→the step (c)→the step (d)→the step (c)→the step (e)
3. the step (a)→the step (b)→the step (d)→the step (c)→the step (e)

The above 1 or 2 is more preferable.

(a) Melting and Kneading Step

The concentration of the antioxidant is preferably 0.2 weight % (hereinafter wt %) or more with respect to the total amount of material resins from the viewpoint of the prevention of molecular deterioration, and is preferably 3 wt % or less from the viewpoint of ecomonical efficiency, The concentration is more preferably 0.4 to 3 wt %, further preferably 0.5 to 2 wt %. The material resin, used herein, refers to the blend of the resin (preferably a polyolefin) as the main component with another organic material (excluding the plasticizer described later) and an inorganic material.

As the antioxidant, a phenol based antioxidant as a primary antioxidant is preferred. Specific examples of the antioxidant include 2,6-di-t-butyl-4-methylphenol, pentaerythrityl-tetrakis-[3-(3,5-di-t-butyl-4-hydroxyphenyl)propionate], and octadecile-3-(3,5-di-t-butyl-4-hydroxyphenyl)propionate. A secondary antioxidant may be used together. Specific examples of the secondary antioxidant include phosphor based antioxidants such as tris(2,4-di-t-butylphenyl)phosphate and tetrakis(2,4-di-t-butylphenyl)-4,4-biphenylenediphosphonite, and a sulfur based antioxidant such as dilauryl-thio-dipropionate.

The plasticizer refers to a nonvolatile solvent capable of forming a homogeneous solution with the material resin at a melting point or a higher temperature, when the plasticizer is mixed with the material resin. Examples of the plasticizer include hydrocarbons such as liquid paraffin and paraffin wax, di-2-ethylhexylphthalate (OOP), diisodecyl phthalate, and diheptyl phthalate. Above all, the liquid paraffin is preferable.

The concentration of the material resin with respect to the total amount of the melted and kneaded material resin and plasticizer is preferably 20 to 95 wt %, further preferably 30 to 80 wt % from the viewpoint of the film permeability and the film preparation properties.

A polymer other than the polyolefin or another material may be blended in such a range that the film preparation properties and the effect of the present invention are not impaired. Furthermore, as required, the known additive, for example, a metal soap such as calcium stearate or zinc stearate, an ultraviolet absorber, a light stabilizer, an antistatic agent, an anticlouding agent, a coloring pigment or the like can be mixed in such a range that the film preparation properties and the effect of the present invention are not impaired.

Examples of the melting/kneading method include a method comprising mixing the materials with a Henschel mixer, a ribbon blender, a tumbler blender or the like, followed by melting and kneading with a screw extruder such as a uniaxial extruder or a biaxial extruder, a kneader, a Banbury mixer or the like. The melting/kneading method is preferably performed with a continuously operable extruder. From the viewpoint of kneading properties, the biaxial extruder is further preferred. The plasticizer may be mixed with the material resin with the above Henschel mixer. Moreover, the material may directly be fed to the extruder during the melting/kneading.

Moreover, the melting/kneading is preferably performed in the atmosphere of an inactive gas such as nitrogen from the viewpoint of the prevention of the deterioration of the resin due to heat.

A temperature during the melting/kneading is preferably 140° C. or higher, more preferably 160° C. or higher, further preferably 180° C. or higher from the viewpoint of dispersibility. The temperature is preferably 300° C. or lower, more preferably 280° C. or lower, further preferably 260° C. or lower from the viewpoint of the prevention of molecular deterioration.

(b) Casting Step

Examples of a method of forming the kneaded material obtained in the melting/kneading step into a sheet-like material include a method of cooling and solidifying the melted material. Examples of a cooling method include a method of bringing the material into direct contact with a cooling medium such as cooling air or cooling water and a method of bringing the material into contact with a roll or a press machine cooled with a refrigerant. The method of bringing the material into contact with the roll or the press machine cooled with the refrigerant is preferred in that excellent thickness control can be achieved.

(c) Drawing Step

Examples of a drawing method include successive biaxial drawing with the combination of a roll drawing machine and a tenter, and simultaneous biaxial drawing with a simultaneous biaxial tenter or inflation forming. Above all, from the viewpoint of high strength, the simultaneous biaxial drawing is preferred, and the simultaneous biaxial drawing with the simultaneous biaxial tenter is further preferred.

A drawing area magnification is preferably 20 times or more from the viewpoint of the improvement of the strength, and is preferably 100 times or less so as to prevent the increase in a thermal contraction stress due to excessive drawing. The drawing area magnification is more preferably 28 to 60 times, further preferably 30 to 50 times.

The drawing magnification ratio of the MD with respect to the TD in the step (c) is preferably 1.0 to 2.5 times, more preferably 1.1 to 2.0 times, further preferably 1.4 to 2.0 times from the viewpoint of the decrease of TD thermal contraction.

A drawing temperature can be determined with reference to the composition or concentration of the material resin. The drawing temperature is preferably in a range from the melting point of the main constituent resin minus 30° C. to the melting point of the main constituent resin, from the viewpoint of the prevention of breakdown due to an excessive drawing stress. When the main component is polyethylene, the temperature is preferably 110° C. or higher, and is preferably 130° C. or lower from the viewpoint of the strength of the microporous film. The drawing temperature is more preferably 115 to 128° C., further preferably 118 to 125° C.

(d) Extracting Step

As an extracting solvent, a preferable solvent is a solvent which is poor solvent to the polyolefin constituting the film and which is good solvent to the plasticizer and which has a boiling point lower than the melting point of the polyolefin constituting the film. Examples of such an extracting solvent include hydrocarbons such as n-hexane and cyclohexane, halogenated hydrocarbons such as methylene chloride and 1,1,1-trichloroethane, non-chlorine based halogenated solvents such as hydrofluoroether and hydrofluorocarbon, alcohols such as ethanol and isopropanol, ethers such as diethyl ether and tetrahydrofuran, and ketones such as acetone and methyl ethyl ketone. The solvent can be appropriately selected from these solvents and used alone or in combination as a mixture. Above all, methylene chloride or methyl ethyl ketone is preferred. Example of a method of extracting the plasticizer includes a method of immersing a sheet obtained via the casting step or the drawing step in the extracting solvent or showering the extracting solvent over the sheet, then followed by drying sufficiently.

Moreover, in a case where the inorganic powder material is added in the step (a), a part or all of the plasticizer can be extracted with a solvent in which the inorganic powder material is soluble.

(e) Heat Setting Step

The heat setting is performed by the combination of low-magnification drawing and an relaxing operation at a predetermined temperature and in a predetermined atmosphere with a tenter, a roll drawing machine or the like.

The treatment temperature of the heat setting step in the present invention is in a range from the melting point of the main constituent resin to the melting point of the main constituent resin minus 10° C. When the heat setting is performed at a temperature which is higher than a temperature 10° C. lower than the melting point of the main constituent resin, the separator has a dynamic friction coefficient of 0.4 or less. When the heat setting is performed at a temperature lower than the melting point, micropores formed in the previous steps are not closed, and thus the separator has permeability. The main constituent resin, used herein, refers to a resin as the main component of the separator. That is, the resin occupies 50 wt % or more of the constituents (excluding the void portions) of the resultant separator. Moreover, the melting point of the main constituent resin is determined by a differential scanning calorimeter (DSC) measurement process.

When homopolyethylene is the main constituent resin, the melting point of the resin is 134° C., and hence the treatment temperature of the heat setting step in this case is 124° C. or higher and lower than 134° C., preferably 130° C. or higher.

The drawing magnification during the low-magnification drawing is preferably 1.1 to 1.8 times, more preferably 1.2 to 1.7 times, further preferably 1.3 to 1.6 times with respect to the MD and/or TD of the film. The excessive drawing unfavorably has a high possibility of the breakdown of the film.

The relaxing operation is an operation of slightly restoring the dimension of the film in the MD and/or the TD. A relaxing magnification with respect to the film dimension during the drawing is preferably 0.9 time or less, more preferably 0.85 time or less, further preferably 0.8 time or less from the viewpoint of the reduction in thermal contraction. The excessive alleviation unfavorably deteriorates productivity.

A surface treatment such as electron beam irradiation, plasma irradiation, ion beam irradiation, surfactant coating or chemical reforming can optionally be performed to such an extent that the effect of the present invention is not impaired. Moreover, as a chemical crosslinking agent, a norbornene resin or the like may be added in advance.

Moreover, as to the surface state of the separator of the present invention, improvement of the absorbing properties of an electrolyte or the operating efficiency of removing a spindle in the winding step of the production process of the battery can be expected.

Physical properties used in the present invention were measured in accordance with the following test methods.

(1) Viscosity Average Molecular Weight Mv

A limiting viscosity [η] in a decalin solvent at 135° C. is determined based on ASTM-04020. The Mv of polyethylene was calculated by the following equation.

$$[\eta]=6.77\times10^{-4}Mv^{0.67}$$

The Mv of polypropylene was calculated by the following equation.

$$[\eta]=1.10\times10^{-4}Mv^{0.80}$$

In the following examples, polyethylene or polypropylene is used, but in any example, polyethylene occupies 90% or more of the resin constituting the separator, and hence the viscosity average molecular weight of the separator in the example is calculated by the above equation for polyethylene.

(2) Molecular Weight Distribution Mw/Mn

The molecular weight distribution Mw/Mn of the polymer material constituting the microporous film made of the polyolefin in the examples and comparative examples was calculated by the measurement of gel permeation chromatography (GPC). A device with the trademark of ALC/GPC of 150-C type manufactured by Waters Co. was used, two 60 cm columns of the trademark of TSK-gel GMH6-HT manufactured by Tosoh Corporation and one column of the trademark of AT-807/S manufactured by Shows Denko K; K were connected in series and used, 1,2,4-trichlorobenzene containing 10 ppm of pentaerythrityl-tetrakis-[3-(3,5-di-t-butyl-4-hydroxyphenyl)propionate] was used as a mobile-phase solvent, and the measurement was performed at 140° C.

A molecular weight distribution data of each sample in terms of polystyrene was determined based on a calibration curve prepared by using, as a standard substance, commercially available monodispersed polystyrene having a known molecular weight, and the resultant value was multiplied by 0.43 (Q factor of polyethylene/Q factor of polystyrene=17.7/41.3), to determine the molecular weight distribution data converted in terms of polyethylene.

(3) Film Thickness (μm)

The film thickness was measured at room temperature of 23±2° C. by use of a micro thickness measurement unit KBM (trademark) manufactured by TOYO SEIKI KOGYO Co., Ltd.

(4) Porosity (%)

A 10 cm×10 cm square sample was cut out from the microporous film, the volume ($cm^3$) and mass (g) of the sample were determined, and the porosity was calculated from these values and a film density (the density of the material constituting the film) ($g/cm^3$) by use of the following equation.

$$\text{Porosity}=(\text{volume}-\text{mass/film density})/\text{volume}\times100$$

It is to be noted that a constant value of 0.95 was used as the film density for the calculation.

(5) Air Permeability (Sec)

The air permeability was measured by Gurley densometer (G-B2 (trademark) manufactured by TOYO SEIKI KOGYO Co., Ltd.) in conformity to JIS P-8.117.

(6) Average Pore Diameter (μm)

As to a fluid in a capillary, it is known that when the mean free path of the fluid is larger than the pore diameters of the capillary, the fluid follows Knudsen flow. When the mean free path is smaller, the fluid follows Poiseuille flow. In consequence, assuming that the flow of air during the measurement of the air permeability of the microporous film follows the Knudsen flow and that the flow of water during the measurement of the water permeability of the microporous film follows the Poiseuille flow, an average pore diameter d (μm) is determined by using the following equation;

$$d=2v\times(R_{liq}/R_{gas})\times(16\eta/3Ps)\times10^6,$$

in which $R_{gas}$ is the permeation speed constant ($m^3$/($m^2\cdot sec\cdot Pa$)) of the air, $R_{liq}$ is the permeation speed constant ($m^3$/($m^2\cdot sec\cdot Pa$)) of the water, v is the molecular speed (m/sec) of the air, η is the viscosity (Pa·sec) of the water, and $P_s$ is a standard pressure (Pa) (=101325 Pa). Here, $R_{gas}$ is determined from the air permeability (sec) by using the following equation.

$$R_{gas}=0.0001/(\text{air permeability}\times(6.424\times10^{-4})\times(0.01276\times101325))$$

It is to be noted that the air permeability is determined in conformity to JIS P-8117.

Moreover, $R_{liq}$ is determined from the water permeability ($cm^3$/(($cm^2\cdot sec\cdot Pa$)) by using the following equation.

$$R_{liq}=\text{water permeability}/100$$

It is to be noted that the water permeability is determined as follows. The microporous film immersed into alcohol is set in a liquid permeation cell made of stainless steel having a diameter of 41 mm, alcohol is removed from the film with water, water is allowed to flow with a differential pressure of about 50000 Pa, and a water permeation amount per unit time/unit pressure/unit area is calculated from the water permeation amount ($cm^3$) after an elapse of 120 sec, and determined to be the water permeability.

Moreover, ν is determined from a gas constant R (=8.314), an absolute temperature T (K), a circle ration and the average molecular weight M (=2.896×10$^{-2}$ kg/mol) of the air by using the following equation.

$$\nu=((8R\times T)/(\pi\times M))^{1/2}$$

(7) Puncture Strength (N/μm)

The microporous film was fixed with a sample holder having an opening with a diameter of 11.3 mm by use of a handy compressive test unit KES-G5 (trademark) manufactured by KATO TECH Co., Ltd. Next, the center of the fixed microporous film was subjected to a puncture test with a needle tip having a curvature radius of 0.5 mm at a puncture speed of 2 mm/sec in the atmosphere at 23±2° C., whereby a maximum load (N) required to puncture a sample was determined.

(8) Tensile Strength (MPa), Tensile Elongation (%)

The measurement for MD and TD samples (shape: width of 10 mm×length of 100 mm) was performed by using a tensile test unit Autograph AG-A type (trademark) manufactured by Shimadzu Corporation in conformity to JIS K7127. Moreover, a distance between chucks was adjusted to 50 mm, one of the surfaces of each of the end portions (25 mm) of the sample were taped with cellophane tape (trade name: N.29 manufactured by Nitto Denko Packing System Co., Ltd.). Furthermore, to prevent the slippage of the sample during the test, a fluorine rubber having a thickness of 1 mm was applied to the inner portion of the chuck of the tensile test unit.

The tensile elongation (%) was determined by dividing an elongation amount (mm) at rupture by the distance (50 mm) between the chucks and multiplying the resultant value by 100.

The tensile strength (MPa) was determined by dividing strength at rupture by the cross-sectional area of the sample before the test. It is to be noted that the measurement was performed at a temperature of 23±2° C. with a chuck pressure of 0.30 MPa and a tensile speed of 200 mm/minute (as to a sample in which the distance of 50 mm between the chucks could not be maintained, the measurement was performed with a strain speed of 400%/min).

(9) Dynamic Friction Coefficient

The dynamic friction coefficients were measured for a sample with a sample size of a width of 50 mm×a length in a measurement direction of 200 mm for three times in each of the MD and TD by using a friction tester KES-SE manufactured by KATO TECH Co., Ltd. on the measuring condition that there is: a load of 50 g; a contactor area of 10 (10=100 mm$^2$ (20 piano wires made of 0.5 mmφ hard stainless steel SUS304 wound without any space between and overlapping with each other)); a contactor forwarding speed of 1 mm/sec; a tensile force of 6 kPa; a temperature of 25° C.; and a humidity of 50%; and the average of the resultant values was determined. It is to be noted that the values of the dynamic friction coefficient shown in Table 1 are the values for the surface that comes into contact with the negative electrode when the separator is incorporated in the battery.

(10) Separator Melting Point

The melting point was measured by using DSC60 manufactured by Shimadzu Corporation. A sample was a 3 mg laminate of several circular pieces having a diameter of 5 mm punched out from the separator. This sample was laid over an aluminum open sample pan having a diameter of 5 mm, a clamping cover was disposed on the sample, and the cover was fixed to the aluminum pan with a sample sealer. Temperatures of 30° C. to 180° C. were measured at a temperature rise speed of 10° C./min in a nitrogen atmosphere, and a temperature at which a fusion heat absorption curve was maximized was determined to be the separator melting point.

(11) Battery Performance Evaluation

Preparation of the positive electrode: A mixture made of 92.2 wt % of lithium cobalt composite oxide $LiCoO_2$ as an active substance, 2.3 wt % of each of phosphor piece-like graphite and acetylene black as conducting aid agents and 3.2 wt % of polyvinylidene fluoride (PVDF) as a binder was dispersed into N-methylpyrrolidone (NMP) to prepare a slurry. The resulting slurry was coated onto both surfaces of an aluminum foil having a thickness of 20 μm and serving as a positive electrode current collector by using a die coater, dried at 130° C. for 3 minutes and then compression molded by using a roll press. In the above step, the amount of coating of the positive electrode active substance was adjusted to 250 g/m$^2$ and bulk density of the active substance was adjusted to 3.00 g/cm$^3$. The resulting foil was cut into strips having a width of 54 mm.

Preparation of the negative electrode 1 (a tin based alloy negative electrode): A mixture made of 85 wt % of Co—Sn—C powder (an element composition ratio of 10-50-40%) prepared as an active substance by a mechanical alloying process, 5 wt % of carbon black as a conducting aid agent and 10 wt % of PVdF as a binder was dispersed into NMP to prepare a slurry. The resulting slurry was coated onto both surfaces of a copper foil having a thickness of 12 μm and serving as a negative electrode current collector by using a die coater, dried at 125° C. for 3 minutes and then compression molded with a roll press. In the above step, the amount of coating of the negative electrode active substance was adjusted to 53 g/m$^2$ and bulk density of the active substance was adjusted to 1.35 g/cm$^3$. The foil thus obtained was cut into strips having a width of 56 mm.

Preparation of the negative electrode 2 (a silicon based alloy negative electrode): 1 g of silicon metal powder having a diameter less than 43 μm, 1 g of polyvinyl alcohol (PVA) powder having a molecular weight of 500 and 3 g of oxalic acid were mixed, and ground by using a high energy mechanical milling unit (SPEX CertiPrep 8000M). Next, the ground mixture was heat treated at 800° C. for 10 hours in an argon atmosphere to completely carbonize PVA, and then the material was ground by a mortar to obtain a negative electrode active substance. 1 g of this active substance powder, 8.6 g of graphite powder having an average particle diameter of 10 μm, 2 g of 10 wt % styrene butadiene rubber (SBR) and 0.2 g of carboxymethyl cellulose (CMC) were mixed, 20 mL of distilled water was introduced, and the resultant material was stirred by a mechanical stirrer for 30 minutes to manufacture a slurry. The resulting slurry was coated onto a copper (Cu) current collector by using a doctor blade until the thickness of the coating became 200 μm and dried, then dried again under vacuum at 110° C. to obtain a negative electrode plate. The plate thus obtained was cut into strips having a width of 56 mm.

Preparation of the negative electrode 3 (a carbon based negative electrode): 96.9 wt % of artificial graphite as an active substance, 1.4 wt % of ammonium salt of carboxymethyl cellulose as a binder and 1.7 wt % of styrene-butadiene copolymer latex were dispersed into purified water to prepare a slurry. The resulting slurry was coated onto both surfaces of a copper foil having a thickness of 12 μm and serving as a negative electrode current collector by using a die coater, was dried at 125° C. for 3 minutes and then compression molded with a roll press. In the above step, the amount of coating of the negative electrode active substance was adjusted to 106 g/m² and bulk density of the active substance was adjusted to 1.55 g/cm³. The foil thus obtained was cut into strips having a width of 56 mm.

Preparation of a nonaqueous electrolyte: $LiPF_6$ was dissolved as a solute in a mixed solvent of ethylene carbonate: ethyl methyl carbonate=1:2 (a volume ratio) so as to obtain a concentration of 1.0 mol/liter, thereby preparing the electrolyte.

Fabrication of battery: A wound electrode plate was prepared by laminating the above polyolefin microporous membrane, a strip positive electrode, and a strip negative electrode (the tin based alloy negative electrode prepared by Preparation of the negative electrode 1) in the order of the strip negative electrode, the separator, the strip positive electrode, and the separator, winding the resulting laminate a plurality of times into a spiral. The wound electrode plate was housed in an aluminum container having an outer diameter of 18 mm and a height of 65 mm and a nickel tab introduced from the positive electrode current collector was welded with the wall of the container and the nickel tab introduced from the negative electrode current collector was welded with a lid terminal portion of the container. Then, drying was performed at 85° C. for 12 hours under vacuum. The above described nonaqueous electrolyte was then injected into the container in an argon box, followed by sealing.

Charging/discharging test: Initial charging/discharging of the battery thus fabricated was performed by constant-current charging at a current rate of ⅙ C to 4.2V and starting to reduce the current to keep a constant voltage of 4.2V, thereby carrying out initial charging for 8 hours in total; and then, discharging at a current rate of ⅙ C to a final voltage of 2.5V. Then, as cycle charging/discharging, charging/discharging was performed 50 times in total under the following cycle conditions: (i) constant-current constant-voltage charging for 8 hours in total at a current rate of 0.5 C and an upper-limit voltage of 4.2V, (ii) non-operation time for 10 minutes, (iii) constant-current discharging at a current rate of 0.5 C to final voltage of 2.5V, and (iv) non-operation time for 10 minutes. The above charging/discharging operations were all performed in an atmosphere of 25° C. and 45° C. Then, a capacity retention ratio (%) was determined by multiplying a ratio of the discharged capacity on cycle 50 to the discharged capacity at the initial charging by 100.

EXAMPLES

The present invention will be described with respect to examples.

Example 1

95 wt % of polyethylene of homopolymer having an Mv of 250,000 and a melting point of 134° C., and 5 wt % of polypropylene of homopolymer having an Mv of 400,000 were dry-blended by using a tumbler blender. 1 wt % of pentaerythrityl-tetrakis-[3-(3,5-di-t-butyl-4-hydroxyphenyl)propionate] was added as an antioxidant to 99 wt % of the resultant pure polymer mixture, and again dry-blended by using the tumbler blender to obtain a mixture of a polymer and the like. After the atmosphere was substituted with nitrogen, the resultant mixture of the polymer and the like was supplied to a biaxial extruder in a nitrogen atmosphere with a feeder. Moreover, liquid paraffin (a dynamic viscosity of $7.59 \times 10^{-5}$ m²/s at 37.78° C.) was injected into an extruder cylinder with a plunger pump.

The feeder and pump were regulated so that the ratio of the amount of the liquid paraffin in whole of the melted, kneaded and extruded mixture was 50 wt %. The melting/kneading was performed on conditions including a preset temperature of 200° C., a screw rotation number of 240 rpm and a discharge amount of 12 kg/h. Subsequently, the melted and kneaded material was extruded and cast onto a cooling roll adjusted to a surface temperature of 25° C. via a T-die, to obtain a gel sheet having a thickness of 1650 μm. Next, the material was guided into a simultaneous biaxial tenter drawing machine, and biaxial drawing was performed. Preset drawing conditions were an MD magnification of 7.0 times, a TD magnification of 6.5 times and a preset temperature of 123° C. Next, the material was guided into a methyl ethyl ketone tank, and sufficiently immersed into methyl ethyl ketone so as to extract and remove the liquid paraffin, and then methyl ethyl ketone was dried and removed. Next, the material was guided into a TD tenter, drawn as much as 1.65 times in a TD direction, and then heat set with a relaxing ratio of 0.80 time at a temperature of 133° C. The viscosity average molecular weight of the resultant microporous film made of the polyolefin was 260,000. Other physical properties and battery performance evaluation results are shown in Table 1.

Example 2

48% of polyethylene of homopolymer having an Mv of 250,000 and a melting point of 134° C., 47% of polyethylene of homopolymer having an Mv of 600,000 and a melting point of 134° C. and 5 wt % of polypropylene of homopolymer having an Mv of 400,000 were dry-blended by using a tumbler blender. 1 wt % of pentaerythrityl-tetrakis-[3-(3,5-di-t-butyl-4-hydroxyphenyl)propionate] was added as an antioxidant to 99 wt % of the resultant pure polymer mixture, and again dry-blended by using the tumbler blender to obtain a mixture of a polymer and the like. After the atmosphere was substituted with nitrogen, the resultant mixture of the polymer and the like was supplied to a biaxial extruder in a nitrogen atmosphere with a feeder. Moreover, liquid paraffin (a dynamic viscosity of $7.59 \times 10^{-5}$ m²/s at 37.78° C.) was injected into an extruder cylinder with a plunger pump.

The feeder and pump were regulated so that the ratio of the amount of the liquid paraffin in whole of the melted, kneaded and extruded mixture was 34 wt %. The melting/kneading was performed on conditions including a preset temperature of 200° C., a screw rotation number of 240 rpm and a discharge amount of 12 kg/h. Subsequently, the melted and kneaded material was extruded and cast onto a cooling roll controlled to a surface temperature of 25° C. through a T-die, to obtain a gel sheet having a thickness of 1800 μm. Next, the material was guided into a simultaneous biaxial tenter drawing machine, and biaxial drawing was performed. Preset drawing conditions were an MD magnification of 7.0 times, a TD magnification of 6.5 times and a preset temperature of 124° C. Next, the material was guided into a methyl ethyl ketone tank, and sufficiently immersed into methyl ethyl ketone so as to extract and remove the liquid paraffin, and then methyl ethyl ketone was dried and removed. Next, the material was guided into a TD tenter, drawn as much as 1.65 times in a TD direction, and then heat set with a relaxing ratio of 0.85 time at a temperature of 131° C. The viscosity average molecular weight of the resultant microporous film made of the polyolefin was 430,000. Other physical properties and battery performance evaluation results are shown in Table 1.

Example 3

50% of polyethylene of homopolymer having an Mv of 250,000 and a melting point of 134° C., and 50% of polyethylene of homopolymer having an Mv of 900,000 and a melting point of 134° C. were dry-blended by using a tumbler blender. 1 wt % of pentaerythrityl-tetrakis-[3-(3,5-di-t-butyl-4-hydroxyphenyl)propionate] was added as an antioxidant to 99 wt % of the resultant pure polymer mixture, and again dry-blended by using the tumbler blender to obtain a mixture of a polymer and the like. After the atmosphere was substituted with nitrogen, the resultant mixture of the polymer and the like was supplied to a biaxial extruder in a nitrogen atmosphere by a feeder. Moreover, liquid paraffin (a dynamic viscosity of $7.59 \times 10^{-5}$ m$^2$/s at 37.78° C.) was injected into an extruder cylinder with a plunger pump.

The feeder and pump were regulated so that the ratio of the amount of the liquid paraffin in whole of the melted, kneaded and extruded mixture was 30 wt %. The melting/kneading was performed on conditions including a preset temperature of 200° C., a screw rotation number of 180 rpm and a discharge amount of 12 kg/h. Subsequently, the melted and kneaded material was extruded and cast onto a cooling roll controlled to a surface temperature of 25° C. through a T-die, to obtain a gel sheet having a thickness of 1800 pin. Next, the material was guided into a simultaneous biaxial tenter drawing machine, and biaxial drawing was performed. Preset drawing conditions were an MD magnification of 7.0 times, a TD magnification of 6.5 times and a set temperature of 123° C. Next, the material was guided into a methyl ethyl ketone tank, and sufficiently immersed into methyl ethyl ketone so as to extract and remove the liquid paraffin, and then methyl ethyl ketone was dried and removed. Next, the material was guided into a TD tenter, drawn as much as 1.80 times in a TD direction, and then heat set with a relaxing ratio of 0.80 time at a temperature of 130° C. The viscosity average molecular weight of the resultant microporous film made of the polyolefin was 600,000. Other physical properties and battery performance evaluation results are shown in Table 1.

Example 4

A battery was assembled in the same manner as in Example 3 except that a silicon based alloy negative electrode prepared by Preparation of the negative electrode 2 was used as a strip-like negative electrode instead of a tin based alloy negative electrode prepared by Preparation of the negative electrode 1. The results of battery performance evaluation are shown in Table 1.

Comparative Example 1

50% of polyethylene of homopolymer having an Mv of 250,000 and a melting point of 134° C., and 50% of polyethylene of homopolymer having an Mv of 900,000 and a melting point of 134° C. were dry-blended by using a tumbler blender. 1 wt % of pentaerythrityl-tetrakis-[3-(3,5-di-t-butyl-4-hydroxyphenyl)propionate] was added as an antioxidant to 99 wt % of the resultant pure polymer mixture, and again dry-blended by using the tumbler blender to obtain a mixture of a polymer and the like. After the atmosphere was substituted with nitrogen, the resultant mixture of the polymer was supplied to a biaxial extruder in a nitrogen atmosphere with a feeder. Moreover, liquid paraffin (a dynamic viscosity of $7.59 \times 10^{-5}$ m$^2$/s at 37.78° C.) was injected into an extruder cylinder by a plunger pump.

The feeder and pump were regulated so that the ratio of the amount of the liquid paraffin in all the melted, kneaded and extruded mixture was 30 wt %. The melting/kneading was performed on conditions including a preset temperature of 200° C., a screw rotation number of 180 rpm and a discharge amount of 12 kg/h. Subsequently, the melted and kneaded material was extruded and cast onto a cooling roll controlled to a surface temperature of 25° C. through a T-die, to obtain a gel sheet having a thickness of 1600 μm. Next, the material was guided into a simultaneous biaxial tenter drawing machine, and biaxial drawing was performed. Preset drawing conditions were an MD magnification of 7.0 times, a TD magnification of 6.5 times and a preset temperature of 123° C. Next, the material was guided into a methyl ethyl ketone tank, and sufficiently immersed into methyl ethyl ketone so as to extract and remove the liquid paraffin, and then methyl ethyl ketone was dried and removed. Next, the material was guided into a TD tenter, drawn as much as 1.60 times in a TD direction, and then heat set with a relaxing ratio of 0.80 time at a temperature of 120° C. The viscosity average molecular weight of the resultant microporous film made of the polyolefin was 600,000. Other physical properties and battery performance evaluation results are shown in Table 1.

Comparative Example 2

45% of polyethylene of homopolymer having an Mv of 250,000 and a melting point of 134° C., 48% of polyethylene of homopolymer having an Mv of 600,000 and a melting point of 134° C. and 7 wt % of polyethylene of homopolymer having an Mv of 400,000 were dry-blended by using a tumbler blender. 1 wt % of pentaerythrityl-tetrakis-[3-(3,5-di-t-butyl-4-hydroxyphenyl)propionate] was added as an antioxidant to 99 wt % of the resultant pure polymer mixture, and again dry-blended by using the tumbler blender to obtain a mixture of a polymer and the like. After the atmosphere was substituted with nitrogen, the resultant mixture of the polymer and the like was supplied to a biaxial extruder in a nitrogen atmosphere with a feeder. Moreover, liquid paraffin (a dynamic viscosity of $7.59 \times 10^{-5}$ m$^2$/s at 37.78° C.) was injected into an extruder cylinder with a plunger pump.

The feeder and pump were regulated so that the ratio of the amount of the liquid paraffin in all the melted, kneaded and extruded mixture was 34 wt %. The melting/kneading was performed on conditions including a preset temperature of 200° C., a screw rotation number of 180 rpm and a discharge amount of 10 kg/h. Subsequently, the melted and kneaded material was extruded and cast onto a cooling roll controlled to a surface temperature of 25° C. through a T-die, to obtain a gel sheet having a thickness of 1450 μm. Next, the material was guided into a simultaneous biaxial tenter drawing machine, and biaxial drawing was performed. Preset drawing conditions were an MD magnification of 7.0 times, a TD magnification of 6.5 times and a preset temperature of 123° C. Next, the material was guided into a methyl ethyl ketone tank, and sufficiently immersed into methyl ethyl ketone so as to extract and remove the liquid paraffin, and then methyl ethyl ketone was dried and removed. Next, the material was guided into a TD tenter, drawn as much as 1.20 times in a TD direction, and then heat set with a relaxing ratio of 0.85 time at a temperature of 123° C. The viscosity average molecular weight of the resultant microporous film made of the polyolefin was 460,000. Other physical properties and battery performance evaluation results are shown in Table 1.

Comparative Example 3

A battery was assembled in the same manner as in Comparative Example 1 except that a carbon based negative electrode prepared by Preparation of the negative electrode 3 was used as a strip-like negative electrode instead of a tin based alloy negative electrode prepared by Preparation of the negative electrode 1. The results of battery performance evaluation are shown in Table 1.

Example 5

A microporous film A prepared by reducing the thickness of a gel sheet to a half, that is, 900 μm in Example 2 and a microporous film B prepared by reducing the thickness of a gel sheet to a half, that is, 800 μm in Comparative Example 1 were press bonded, to obtain a microporous film having a film thickness of 20 μm in total. The microporous film was disposed so that the surface of the microporous film A faces to a negative electrode surface, to prepare a wound electrode plate. Physical properties and battery performance evaluation results are shown in Table 1.

Comparative Example 4

A wound electrode plate was prepared with a drawn pore opening film (having a dynamic friction coefficient of 0.08 in both MD and TD directions) of a commercially available polyethylene single layer film having a thickness of 20 μm. When a battery performance was similarly evaluated, normal temperature cycle performance was 50%, and high temperature cycle performance was 35%.

Comparative Example 5

A wound electrode plate was prepared with a drawn pore opening film (a dynamic friction coefficient of MD direction: 0.65, TO direction: 0.62) of a commercially available laminated film of three layers of polypropylene/polyethylene/polypropylene having a thickness of 20 μm. When a battery performance was similarly evaluated, normal temperature cycle performance was 40%, and high temperature cycle performance wase 30%.

On the other hand, as to any one of the batteries of Comparative Examples 1, 2 using separators each having a dynamic friction coefficient larger than the value range of the present invention and the battery of Comparative Example 4 using a separator having a dynamic friction coefficient smaller than the value range of the present invention, normal temperature cycle performance and high temperature cycle performance were low, and the batteries had a poor performance.

Moreover, even when a separator having a dynamic friction coefficient larger than the value range of the present invention is used, in the case of the battery of Comparative Example 3 with a carbon based negative electrode as the negative electrode, the deterioration of the cycle performance was not recognized. In consequence, it can be considered that the effect of the separator of the present invention has an advantage when it is used in combination with the alloy based negative electrode.

Industrial Applicability

A separator of the present invention has an excellent resistance to friction, and can achieve an excellent cycle performance when the separator is used in a high-capacity lithium ion secondary battery with a alloy based negative electrode which noticeably expands or contracts. Specifically, the separator can preferably be used in, for example, a cylindrical battery for a notebook-size personal computer, having a high capacity of 2.8 Ah or more and a 18650 size.

The invention claimed is:

1. A lithium ion secondary battery with an alloy based negative electrode containing a separator, wherein the separator has

TABLE 1

|  | | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Film thickness ((m) | | 20 | 20 | 18 | 18 | 20 | 20 | 18 | 20 | 20 | 20 |
| Porosity (%) | | 40 | 40 | 42 | 42 | 40 | 40 | 47 | 40 | — | — |
| Air permeability (sec/100 cc) | | 250 | 260 | 250 | 250 | 280 | 250 | 180 | 250 | — | — |
| Puncture strength(N) | | 4.4 | 6.0 | 5.5 | 5.5 | 5.5 | 5 | 3.5 | 5 | — | — |
| MD tensile strength (MPa) | | 103 | 132 | 137 | 137 | 138 | 147 | 114 | 147 | — | — |
| TD tensile strength (MPa) | | 99 | 127 | 145 | 145 | 120 | 118 | 49 | 118 | — | — |
| Average pore diameter (μm) | | 0.085 | 0.075 | 0.060 | 0.060 | 0.065 | 0.045 | 0.053 | 0.045 | — | — |
| Mw/Mn | | 4 | 6 | 6 | 6 | 6 | 6 | 7 | 7 | — | — |
| Dynamic friction coefficient | MD | 0.14 | 0.36 | 0.25 | 0.25 | 0.36 | 0.50 | 0.45 | 0.50 | 0.08 | 0.65 |
| | TD | 0.14 | 0.38 | 0.27 | 0.27 | 0.38 | 0.45 | 0.45 | 0.45 | 0.08 | 0.62 |
| Normal temperature cycle performance (%) | | 65 | 85 | 90 | 85 | 85 | 55 | 50 | 90 | 50 | 40 |
| High temperature cycle performance (%) | | 50 | 70 | 75 | 70 | 70 | 40 | 35 | 75 | 35 | 30 |

As to the lithium ion secondary batteries with alloy based negative electrodes using separators each having a dynamic friction coefficient in a value range of the present invention of Examples 1 to 5, both normal temperature cycle performance and high temperature cycle performance were high, and excellent battery performances were achieved.

a dynamic friction coefficient in a machine direction and/or in a transverse direction of at least one surface is 0.1 or more and 0.4 or less, and wherein the dynamic friction coefficient is measured for a sample with a sample size of a width of 50 mm and a length in a measurement direction of 200 mm for three times in each of the machine direction and/or transverse direction by using a friction tester KES-SE manufactured by KATO TECH Co., Ltd. on the measuring condition that there is: a load of 50 g; a contactor area of 10 (10=100 mm$^2$ (20 piano wires made of 0.5 mm$\phi$ hard stainless steel SUS304 wound without any space between and overlapping with each other)); a contactor forwarding speed of 1 mm/sec; a tensile force of 6 kPa; a temperature of 25° C.; and a humidity of 50%; and the average of the resultant values was determined, and wherein the alloy based negative electrode comprises at least one of a tin based alloy element and a silicon based alloy element which can occlude and release lithium as a negative electrode active substance.

2. The lithium ion secondary battery with an alloy based negative electrode containing a separator according to claim 1, the separator having a thickness change allowance of 5 μm or more and 20 μm or less.

3. The lithium ion secondary battery with an alloy based negative electrode containing a separator according to claim 1 or 2, the separator having a porosity of 10% or more and 80% or less.

4. The lithium ion secondary battery with an alloy based negative electrode containing a separator according to claim 1 or 2, wherein the separator comprises at least two layers.

5. The lithium ion secondary battery with an alloy based negative electrode containing a separator according to claim 1 or 2, the separator having an average pore diameter of from 0.01 to 0.1 μm and a thickness of from 1 to 50 μm.

6. The lithium ion secondary battery with an alloy based negative electrode containing a separator according to claim 1 or 2, the separator having a puncture strength of 0.15 N/μm or more.

7. The lithium ion secondary battery with an alloy based negative electrode containing a separator according to claim 1 or 2, wherein a main component of the separator is a polyolefin.

8. The lithium ion secondary battery with an alloy based negative electrode containing a separator according to claim 7, wherein the polyolefin has a viscosity average molecular weight of 300,00 or more.

9. The lithium ion secondary battery with an alloy based negative electrode containing a separator according to claim 7, wherein the polyolefin has a molecular weight distribution Mw/Mn of 3 or more and less than 10.

10. A method for manufacturing the lithium ion secondary battery with an alloy based negative electrode containing a separator according to claim 1 or 2, comprising: (a) a step of melting and kneading a resin and a plasticizer; (b) a step of extruding the melted material into the form of a sheet, followed by cooling to solidify the sheet; (c) a step of drawing the sheet in at least one direction; (d) a step of extracting the plasticizer; and (e) a step of heat setting the sheet, wherein a heat setting temperature in step (e) is higher than a temperature which is 10° C. lower than the melting point of the main constituent resin of the separator, and is lower than the melting point of the main constituent resin.

\* \* \* \* \*